(12) United States Patent
Muramatsu et al.

(10) Patent No.: US 11,285,586 B2
(45) Date of Patent: Mar. 29, 2022

(54) ELECTRIC POWER TOOL

(71) Applicant: Panasonic Intellectual Property Management Co., Ltd., Osaka (JP)

(72) Inventors: Masari Muramatsu, Mie (JP); Takashi Kusagawa, Osaka (JP); Fumiaki Sawano, Mie (JP); Hidenori Shimizu, Mie (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 45 days.

(21) Appl. No.: 16/115,374

(22) Filed: Aug. 28, 2018

(65) Prior Publication Data

US 2019/0061117 A1    Feb. 28, 2019

(30) Foreign Application Priority Data

Aug. 29, 2017   (JP) .............................. JP2017-164465

(51) Int. Cl.
| | |
|---|---|
| *B25F 5/00* | (2006.01) |
| *B25B 21/02* | (2006.01) |
| *B25F 5/02* | (2006.01) |
| *H02K 11/215* | (2016.01) |
| *B25B 23/147* | (2006.01) |
| *H02K 7/08* | (2006.01) |
| *H02K 5/173* | (2006.01) |
| *H02K 7/14* | (2006.01) |

(52) U.S. Cl.
CPC .......... *B25B 21/02* (2013.01); *B25B 23/1475* (2013.01); *B25F 5/001* (2013.01); *B25F 5/02* (2013.01); *H02K 5/1732* (2013.01); *H02K 7/083* (2013.01); *H02K 11/215* (2016.01); *H02K 7/145* (2013.01)

(58) Field of Classification Search
CPC ... B25B 21/02; B25B 23/1475; H02K 11/215; H02K 7/083; H02K 5/1732; H02K 7/145; B25F 5/02; B25F 5/001
USPC ........................................................ 173/164
See application file for complete search history.

(56) References Cited

U.S. PATENT DOCUMENTS

| | | | | |
|---|---|---|---|---|
| 3,804,180 | A | * | 4/1974 | Gelfand .................. B25B 21/02 173/15 |
| 4,135,356 | A | * | 1/1979 | Wolstencroft ........... D02G 1/08 57/100 |
| 4,385,276 | A | * | 5/1983 | Bitzel ..................... G01P 3/487 310/47 |

(Continued)

FOREIGN PATENT DOCUMENTS

JP    2017-039203 A    2/2017

OTHER PUBLICATIONS

Extended European Search Report issued in corresponding European Patent Application No. 18185837.4, dated Feb. 22, 2019.

*Primary Examiner* — Robert F Long
(74) *Attorney, Agent, or Firm* — McDermott Will & Emery LLP

(57) ABSTRACT

An electric power tool includes a bearing retainer that retains a bearing for supporting a motor shaft, a transmission mechanism that transmits a rotational output of a motor to a front-end tool and a rotating body attached to an end of the motor shaft. The bearing retainer includes an extension that extends in a direction of axial line from an end face position on the bearing. At least a part of the rotating body is provided in front of a rear end of the extension.

6 Claims, 3 Drawing Sheets

(56) References Cited

U.S. PATENT DOCUMENTS

| | | | | |
|---|---|---|---|---|
| 4,491,752 A * | 1/1985 | O'Hara | | H02K 23/66 310/71 |
| 4,553,056 A * | 11/1985 | Pfister | | H02K 7/083 310/80 |
| 4,558,189 A * | 12/1985 | Dibbern, Jr. | | H01H 9/06 200/1 V |
| 4,684,774 A * | 8/1987 | Dibbern, Jr. | | H01H 9/06 200/275 |
| 4,855,610 A * | 8/1989 | Morishita | | F02N 15/06 290/48 |
| 5,036,926 A * | 8/1991 | Cavedo | | B25F 5/02 173/104 |
| 5,197,342 A * | 3/1993 | Nakagawa | | F02N 15/06 74/7 A |
| 5,201,373 A * | 4/1993 | Bloechle | | B25D 16/003 173/109 |
| 5,250,862 A * | 10/1993 | Uzawa | | F16C 33/103 310/40 MM |
| 5,584,618 A * | 12/1996 | Blankenship | | B23B 31/22 408/1 R |
| 5,917,259 A * | 6/1999 | Stridsberg | | F16D 3/72 310/75 D |
| 5,992,539 A * | 11/1999 | Lin | | B25B 21/02 173/169 |
| 6,003,618 A * | 12/1999 | Wallace | | B25B 21/026 173/93 |
| 6,342,739 B1 * | 1/2002 | Furuya | | F16C 33/08 310/40 MM |
| 6,949,851 B2 * | 9/2005 | Wysk | | H02K 5/10 310/88 |
| 8,202,071 B2 * | 6/2012 | Kii | | F04C 23/008 418/94 |
| 8,387,898 B1 * | 3/2013 | Mancl | | F16C 33/76 239/340 |
| 9,360,295 B2 * | 6/2016 | Taniguchi | | G01D 11/30 |
| 9,444,313 B2 | 9/2016 | Taniguchi | | |
| 9,994,398 B1 * | 6/2018 | Hansson | | B65G 23/08 |
| 2002/0044876 A1 * | 4/2002 | Yoshimura | | F04C 27/009 417/410.4 |
| 2002/0096953 A1 * | 7/2002 | Shingai | | B29C 45/26 310/90 |
| 2003/0072631 A1 * | 4/2003 | Endo | | B23Q 1/0009 409/231 |
| 2003/0107273 A1 * | 6/2003 | Ikeda | | H02K 5/08 310/43 |
| 2003/0220058 A1 * | 11/2003 | Pollak | | B24B 47/10 451/357 |
| 2004/0256932 A1 * | 12/2004 | Kurosawa | | H02K 5/1732 310/89 |
| 2005/0188498 A1 * | 9/2005 | Thanner | | F16D 7/022 15/344 |
| 2005/0257991 A1 * | 11/2005 | Ishii | | B62D 5/0421 180/444 |
| 2008/0272665 A1 * | 11/2008 | Tse | | H02K 15/02 310/156.01 |
| 2010/0225186 A1 * | 9/2010 | Hu | | H02K 7/003 310/74 |
| 2011/0036609 A1 * | 2/2011 | Blickle | | B24B 23/028 173/213 |
| 2011/0147030 A1 * | 6/2011 | Blum | | B25F 5/008 173/217 |
| 2011/0232930 A1 * | 9/2011 | Zhang | | B25B 21/02 173/178 |
| 2012/0200180 A1 * | 8/2012 | Mizumaki | | H02K 37/14 310/49.01 |
| 2013/0026888 A1 * | 1/2013 | Migita | | H02K 29/08 310/68 B |
| 2013/0140964 A1 * | 6/2013 | Matsunaga | | B62D 5/0403 310/68 B |
| 2013/0294951 A1 * | 11/2013 | Ishikawa | | F04B 39/121 417/410.5 |
| 2014/0124228 A1 * | 5/2014 | Kviberg | | B25B 21/02 173/93.5 |
| 2014/0246958 A1 * | 9/2014 | Taniguchi | | H02K 21/14 310/68 B |
| 2014/0262409 A1 * | 9/2014 | McRoberts | | B23Q 11/0883 173/216 |
| 2014/0312746 A1 * | 10/2014 | Taniguchi | | H02K 29/08 310/68 B |
| 2015/0129248 A1 * | 5/2015 | Nitsche | | B25D 16/006 171/1 |
| 2015/0151395 A1 * | 6/2015 | Halm | | B23B 31/261 173/197 |
| 2015/0155759 A1 * | 6/2015 | Matsuo | | H02K 9/22 310/52 |
| 2015/0162798 A1 * | 6/2015 | Ozawa | | H02K 5/1735 310/43 |
| 2016/0002543 A1 | 1/2016 | Tsebulaev et al. | | |
| 2016/0288308 A1 * | 10/2016 | Kuhnle | | B25F 5/001 |
| 2016/0294248 A1 * | 10/2016 | Atarashi | | H02K 3/522 |
| 2016/0352189 A1 * | 12/2016 | Yamada | | H02K 11/215 |
| 2016/0354911 A1 * | 12/2016 | Aoki | | B25F 5/00 |
| 2016/0354913 A1 * | 12/2016 | Madineni | | H02K 7/145 |
| 2017/0106490 A1 | 4/2017 | Privett, Jr. et al. | | |
| 2017/0165824 A1 | 6/2017 | Takeda | | |
| 2018/0021907 A1 * | 1/2018 | Suzuki | | B23Q 11/12 173/217 |
| 2018/0290275 A1 * | 10/2018 | Asplund | | B25B 23/1475 |
| 2019/0039227 A1 * | 2/2019 | Takeda | | B24B 41/007 |
| 2019/0133609 A1 * | 5/2019 | Sallaz | | A61B 5/6847 |
| 2019/0265070 A1 * | 8/2019 | Hori | | G01D 5/145 |
| 2020/0186008 A1 * | 6/2020 | Murakami | | H02K 11/215 |

* cited by examiner

ELECTRIC POWER TOOL

CROSS-REFERENCE TO RELATED APPLICATIONS

This application is based upon and claims the benefit of priority of Japanese Patent Application Number 2017-164465, filed on Aug. 29, 2017, the entire contents of which are hereby incorporated by reference.

BACKGROUND

The disclosure relates to an electric power tool including a motor.

Japanese Unexamined Patent Application Publication No. 2017-39203 discloses an impact tool that applies a rotary impact force to an anvil by means of a hammer. In this impact tool, the bearing retained by the housing axially supports the rear end of the rotary shaft of the motor. By allowing the housing to retain the bearing that supports the rotary shaft of the motor, the strength of the electric power tool in the direction of axial line against the drop impact force is secured.

In electric power tools such as a rotary impact tool, control for estimating the tightening torque from the angle of rotation of the motor is exercised. To increase the precision of estimating the tightening torque, a rotation detector for detecting the angle of rotation of the motor with a high precision needs to be provided in the electric power tool. If, for example, the rotation detector is provided behind the motor, it would be difficult to allow the housing to retain the bearing that supports the motor shaft. This is addressed by providing a rib member to project from the inner circumferential surface of the housing and retaining the bearing by means of the rib member. In this case, it is necessary to structure the rib member to have a sufficient strength in the direction of axial line against the drop impact force.

SUMMARY

In this background, a purpose of the present disclosure is to provide a bearing retention structure in which the strength in the direction of axial line against the drop impact force is increased.

An electric power tool according to an aspect of the present disclosure includes:

a motor including a motor shaft;

a bearing retainer that retains a bearing for supporting the motor shaft;

a transmission mechanism that transmits a rotational output of the motor to a front-end tool; and a rotating body attached to an end of the motor shaft, wherein the bearing retainer includes an extension that extends in a direction of axial line from an end face position on the bearing. At least a part of the rotating body is provided in front of a rear end of the extension.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION

One aspect of the disclosure will now be described by reference to the preferred embodiments. This does not intend to limit the scope of the present invention, but to exemplify the invention.

Figure 1:
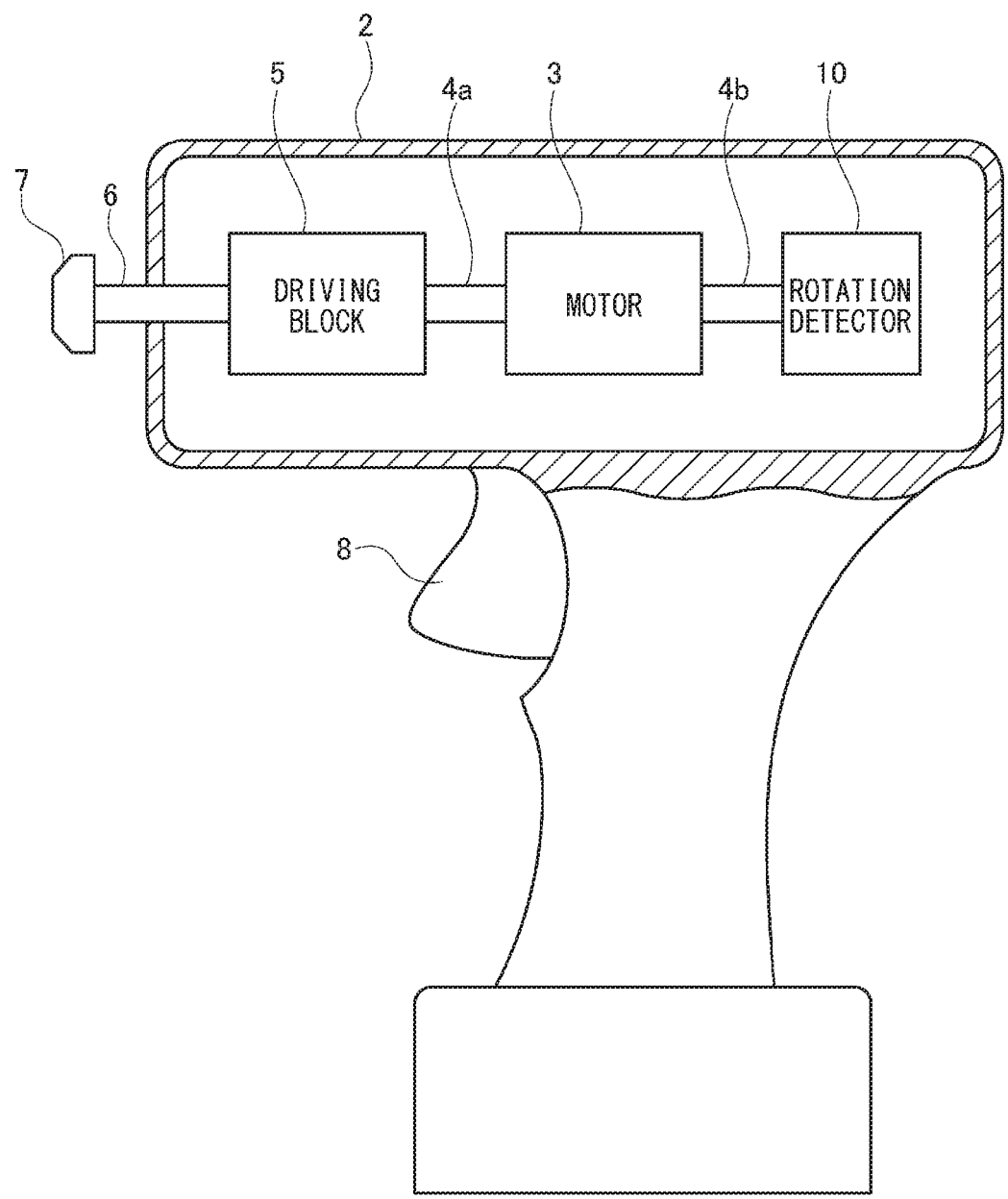
FIG. 1 is a schematic view of the electric power tool according to an embodiment.

FIG. 1 is a schematic view of the electric power tool according to an embodiment of the disclosure. An electric power tool 1 includes a housing 2, and a motor 3 is built in the housing 2. The motor 3 is configured as a built-in motor that functions by building a stator and a rotor, integrated with a motor shaft, in the housing 2. The absence of a motor case contributes to the compact size and light weight of the electric power tool 1. The motor shaft in front of the motor 3 will be referred to as "a motor shaft 4a" and the motor shaft behind will be referred to as "a motor shaft 4b".

A driving block 5 includes a transmission mechanism for transmitting a rotational output of the motor 3 to a front-end tool. More specifically, the driving block 5 may include a power transmission mechanism for transmitting the rotational output of the motor shaft 4a to an output shaft 6. The power transmission mechanism may include a planetary gear deceleration mechanism in mesh with a pinion gear fitted to the motor shaft 4a. In the case where the electric power tool 1 is a rotary impact tool, the power transmission mechanism includes an impact mechanism for generating an intermittent rotary impact force in the output shaft 6. A chuck mechanism 7 is coupled to the output shaft 6. A front-end tool such as a drill and a driver is removably attached to the chuck mechanism 7. A user operation switch 8 controlled by an operator is provided in a grip of the housing 2. When the operator pulls the user operation switch 8, the rotor in the motor 3 is rotated so that the output shaft 6 drives the front-end tool.

The motor 3 is a brushless motor of an inner rotor type. The rotor including a plurality of permanent magnets is rotated inside the stator. The rotor and the stator that constitute the motor 3 are fixed separately and independently to the housing 2. The housing 2 is comprised of a pair of (left and right) half housing members sandwiching a perpendicular plane that crosses the line of rotational axis at the center of the electric power tool 1.

A rotation detector 10 for detecting the angle of rotation of the motor is provided behind the motor 3. The rotation detector 10 includes a rotating body attached to the end of the motor shaft 4b and a position detector for outputting a rotational position signal determined by the rotational position of the rotating body. The position detector may be a sensor provided in a sensor substrate arranged to face the rotating body in the direction of axial line. The rotation detector 10 may be a magnetic encoder or an optical encoder.

In the case where the rotation detector 10 is a magnetic encoder, the rotating body includes a magnet, and the position detector includes a magnetic sensor for detecting variation in magnetic force. To increase the precision of detecting the angle of motor rotation, the gap between the rotating body and the position detector is configured to be small. For example, the gap is about 2 mm. In the case where the rotation detector 10 is an optical encoder, the rotating body is a rotating disc formed with a slit that shields/transmits light. The position detector includes a light receiving device such as a photodiode. The rotation detector 10 may be an encoder of a desired type, and the position detector outputs a rotational position signal determined by the rotational position of the rotating body to a controller (not shown) for controlling the motor rotation.

As shown in FIG. 1, the rotation detector 10 is provided behind the motor 3. Therefore, a retainer to retain the bearing for supporting the motor shaft 4b cannot be formed in the housing 2. This is addressed by structuring the electric power tool 1 such that a rib member is provided to project from the inner circumferential surface of the housing 2 and the bearing is retained by the rib member. Since the gap between the rotating body and the position detector is configured to be small, it is necessary for this bearing retention structure to have a sufficient strength in the direction of axial line against the drop impact force in the electric power tool 1.

Figure 2:
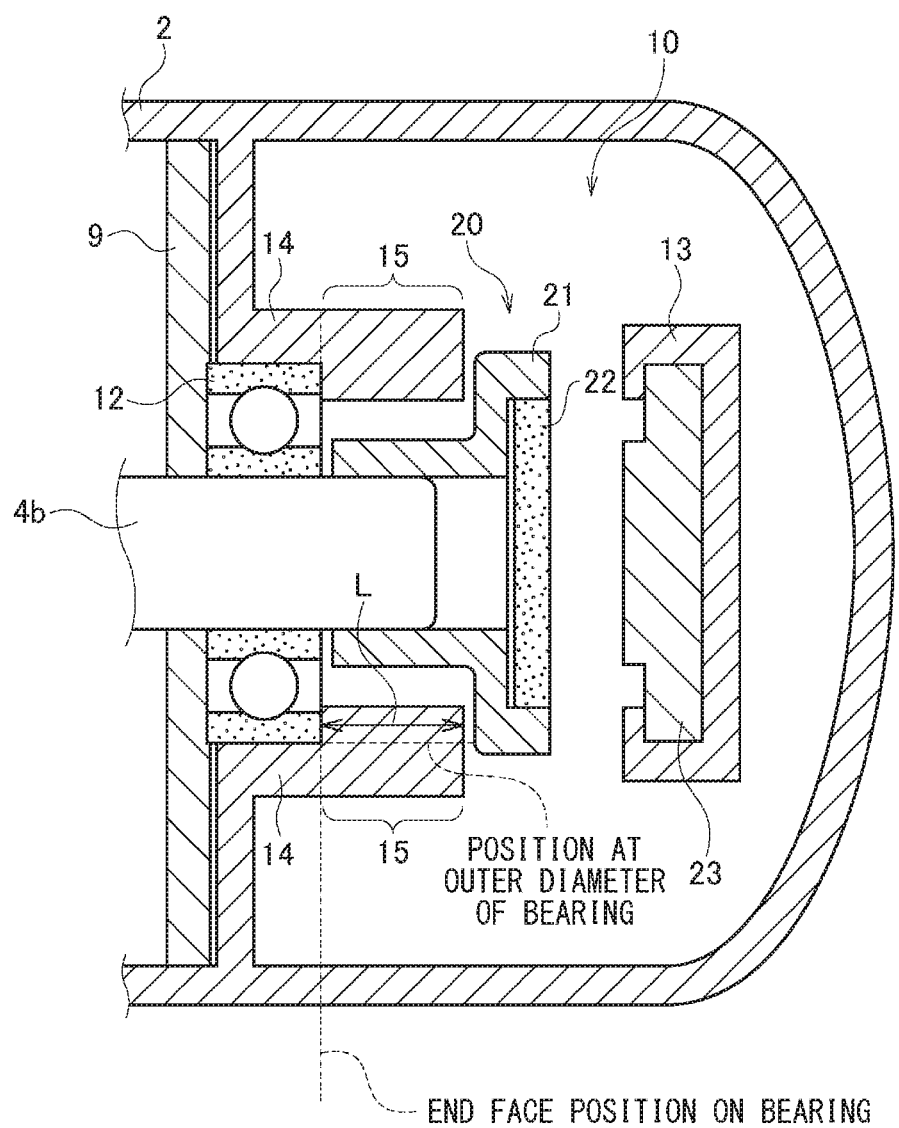
FIG. 2 shows an example of the bearing retention structure.

FIG. 2 shows an example of the bearing retention structure. A bearing 12 supports the motor shaft 4b toward the rear end of the motor 3. A bearing retainer 14 is a rib member provided on the inner circumferential surface of the housing 2 and has a circumferential groove that retains the outer ring of the bearing in the radial direction and the direction of axial line. The bearing retainer 14 retains the rear end face side of the bearing 12 in the direction of axial line, and the front end face side of the bearing 12 is retained by a holding member 9.

The rotating body 20 represents a component in the magnetic encoder and includes a magnet 22 and a mount 21 for securing the magnet 22. The mount 21 is formed with a concave part in which the magnet 22 is fitted, and the magnet 22 is fitted and secured in the concave part. The magnet 22 may be adhesively fixed in the concave part. A magnetic sensor substrate 23 is retained by a substrate retainer 13, which is a rib member provided toward the rear end of the housing 2. The magnetic sensor substrate 23 is arranged to face the rotating body 20, and, specifically, the magnet 22, in the direction of axial line and carries a magnetic sensor that is a detector for detecting the angle of rotation of the motor 3.

The mount 21 includes an opening, and the motor shaft 4b is press fitted in the opening of the mount 21. By press fitting the motor shaft 4b in the opening of the mount 21, not only the assembly process is made easier but also the number of components and the size are reduced as compared with the case of fastening the motor shaft 4b and the mount 21 using a screw.

When the electric power tool 1 drops and the drop impact force is exerted in the direction of axial line of the electric power tool 1, a shearing force along the axial line aligned with the outer diameter (outer edge) of the bearing 12 is exerted on the bearing retainer 14 due to the load received by the bearing 12 mainly from the motor 3. In this background, the bearing retainer 14 according to the embodiment includes a pair of extensions 15 that extend from the respective end face positions of the bearing 12 in the direction of axial line to increase the strength against the shearing force caused by the drop impact. The pair of extensions 15 according to the embodiment are formed as parallel rib members that connect the inner circumferential surface of the housing 2 in the horizontal direction.

As shown in the figure, at least a part of the rotating body 20, and, in the illustrated example, a part of the mount 21, is provided in front of the rear end of the extensions 15. In other words, at least a part of the rotating body 20 constituting the rotation detector 10 is housed in the space formed between the pair of parallel extensions 15. In this way, the space formed by the extensions 15 can be exploited efficiently. As compared with a configuration in which the mount 21 is provided outside the extensions 15, the length of electric power tool 1 in the direction of axial line is advantageously reduced.

As described above, a shearing force along the axial line aligned with the outer diameter of the bearing is exerted when the drop impact force is exerted on the electric power tool 1. It is therefore preferred to form the extensions 15 such that the length thereof in the direction of axial line from the end face positions is largest at the outer diameter (outer edges) of the bearing so as to increase the strength along the axial line aligned with the outer diameter of the bearing. In the example shown in FIG. 2, the extensions 15 are formed such that the length thereof from the bearing end face positions in the direction of axial line is L uniformly, regardless of the radial position.

Figure 3:
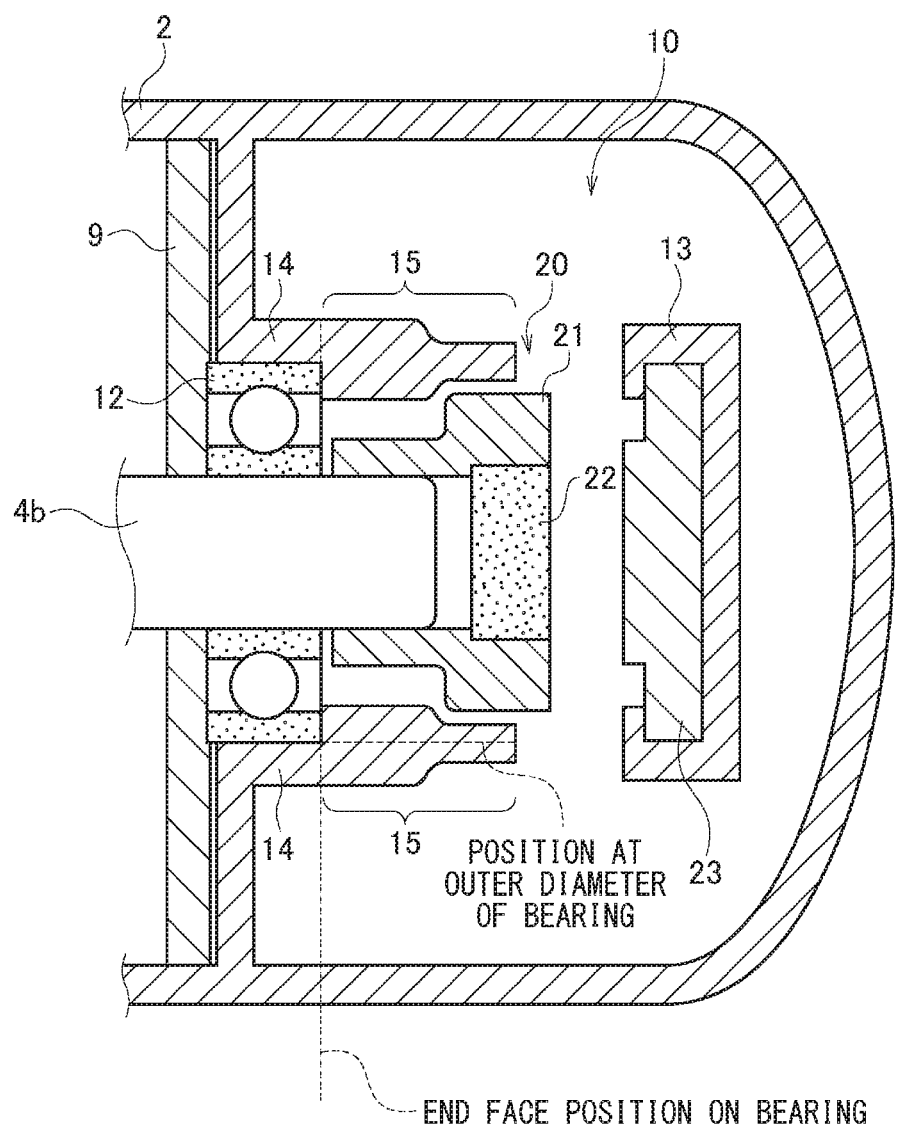
FIG. 3 shows another example of the bearing retention structure.

FIG. 3 shows another example of the bearing retention structure. A bearing 12 supports the motor shaft 4b toward the rear end of the motor 3. A bearing retainer 14 is a rib member provided on the inner circumferential surface of the housing 2 and has a circumferential groove that retains the outer ring of the bearing in the radial direction and the direction of axial line. The bearing retainer 14 retains the rear end side of the bearing 12 in the direction of axial line, and the front end face side of the bearing 12 is retained by the holding member 9.

In the bearing retainer 14, the extensions 15 extending in the direction of axial line from the end face positions on the bearing 12 are formed such that the length thereof in the direction of axial line from the end face positions is largest at the outer diameter of the bearing. In the example shown in FIG. 2, the extensions 15 are formed such that the length thereof in the direction of axial line is L uniformly, regardless of the radial position. However, the extensions 15 shown in FIG. 3 differ from the extensions 15 shown in FIG. 2 in the following respects.

The extensions 15 shown in FIG. 3 are formed such that the length thereof in the direction of axial line from the end face positions at the outer diameter of the bearing is larger than the length in the direction of axial line from the end face positions internal to the outer diameter of the bearing. It is required to form the length of the extensions 15 in the direction of axial line at the positions at the outer diameter of the bearing to be thick in order to increase the strength against the shearing force caused by the drop impact. Meanwhile, the part internal to the outer diameter of the bearing does not directly increase the strength against the shearing force. It is therefore preferred to form the part of the extensions 15 internal to the outer diameter of the bearing to be relatively short so as to reduce the weight.

Further, the extensions 15 shown in FIG. 3 are formed such that the length thereof in the direction of axial line from the end face positions at the outer diameter of the bearing is larger than the length in the direction of axial line from the end face positions external to the outer diameter of the bearing. Forming the part external to the outer diameter of the bearing to be short enlarges the available space (e.g., the space for guiding the wirings is secured) as well as reducing the weight.

In order to implement the features described above, it is preferred to form the outermost diameter of the mount 21 to be smaller than the outer diameter of the bearing 12. This allows the length of the extensions 15 in the direction of axial line at the positions of the outer diameter of the bearing to be extended as far as or beyond the outermost diameter of the mount 21 so as to increase the strength against the shearing force caused by the drop impact.

Described above is an explanation based on an exemplary embodiment. The embodiment is intended to be illustrative only and it will be understood by those skilled in the art that various modifications to constituting elements and processes could be developed and that such modifications are also within the scope of the present disclosure.

An embodiment of the present disclosure is summarized below. An electric power tool according to an embodiment includes: a motor (3) including a motor shaft (4b); a bearing retainer (14) that retains a bearing (12) for supporting the motor shaft (4b); a transmission mechanism (5) that transmits a rotational output of the motor to a front-end tool; and a rotating body (20) attached to an end of the motor shaft. The bearing retainer (14) includes an extension (15) that extends in a direction of axial line from an end face position on the bearing (12), and at least a part of the rotating body is provided in front of a rear end of the extension.

The extension (15) is preferably formed such that a length of the extension (15) in the direction of axial line from an end face position is largest at an outer diameter of the bearing. The extension (15) is preferably formed such that a length of the extension in the direction of axial line from an end face position at an outer diameter of the bearing is larger than a length in the direction of axial line from an end face position internal to the outer diameter of the bearing. The extension (15) is preferably formed such that a length of the extension in the direction of axial line from an end face position at an outer diameter of the bearing is larger than a length in the direction of axial line from an end face position external to the outer diameter of the bearing. An outermost diameter of the rotating body (20) is preferably formed to be smaller than an outer diameter of the bearing (12).

The electric power tool (1) may further include: a detector (23) arranged to face the rotating body (20) in the direction of axial line to detect an angle of rotation of the motor (3). The detector may be a magnetic sensor, and the rotating body (20) may include a magnet (22) and a mount (21) for securing the magnet.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. An electric power tool comprising:
a housing;
a motor including a motor shaft having a first portion extending toward a front end of the housing from the motor in an axial direction of the motor shaft and a second portion extending toward a rear end of the housing from the motor in the axial direction;
a bearing retainer that has a circumferential groove that retains an outer ring of a bearing in a radial direction of the bearing and the axial direction, the bearing supporting the second portion of the motor shaft;
a transmission mechanism, coupled to the first portion of the motor shaft, that transmits a rotational output of the motor to a front-end tool at the front end of the housing; and
a rotating body attached to an end of the second portion of the motor shaft, wherein
the bearing retainer includes an extension that contacts a rear end face of the bearing and extends in the axial direction from the rear end face of the bearing,
the rotating body has a first outer diameter at a proximal portion of the rotating body adjacent to the motor shaft and a second outer diameter at a distal portion of the rotating body axially opposite to the proximal portion, the proximal portion being closer to the bearing than the distal portion,
the first outer diameter is smaller than the second outer diameter, and the second outer diameter of the rotating body is smaller than an outer diameter of the bearing and is smaller than a maximum inner diameter of the extension, and
the extension overlaps at least partially the distal portion of the rotating body having the second outer diameter, the rotating body is located in an inside of the extension.

2. The electric power tool according to claim 1, wherein the extension is formed such that a length of the extension in the axial direction from an end face of the bearing is largest at an outermost diameter of the bearing.

3. The electric power tool according to claim 1, wherein the extension is formed such that a length of the extension in the axial direction from an end face position of the bearing at an outermost diameter of the bearing is larger than a length of the extension in the axial direction from the end face position internal to the outermost diameter of the bearing.

4. The electric power tool according to claim 1, wherein the extension is formed such that a length of the extension in the axial direction from an end face position of the bearing at an outermost diameter of the bearing is larger than a length of the extension in the axial direction from the end face position external to the outermost diameter of the bearing.

5. The electric power tool according to claim 1, further comprising:
a detector arranged to face the rotating body in the axial direction to detect an angle of rotation of the motor.

6. The electric power tool according to claim 5, wherein the detector is a magnetic sensor, and
the rotating body includes a magnet and a mount for securing the magnet, wherein at least a portion of the mount includes the second outer diameter of the rotating body.

* * * * *